April 13, 1926.
A. ANDERSON
OPHTHALMIC MOUNTING
Filed Dec. 15, 1925
1,580,632
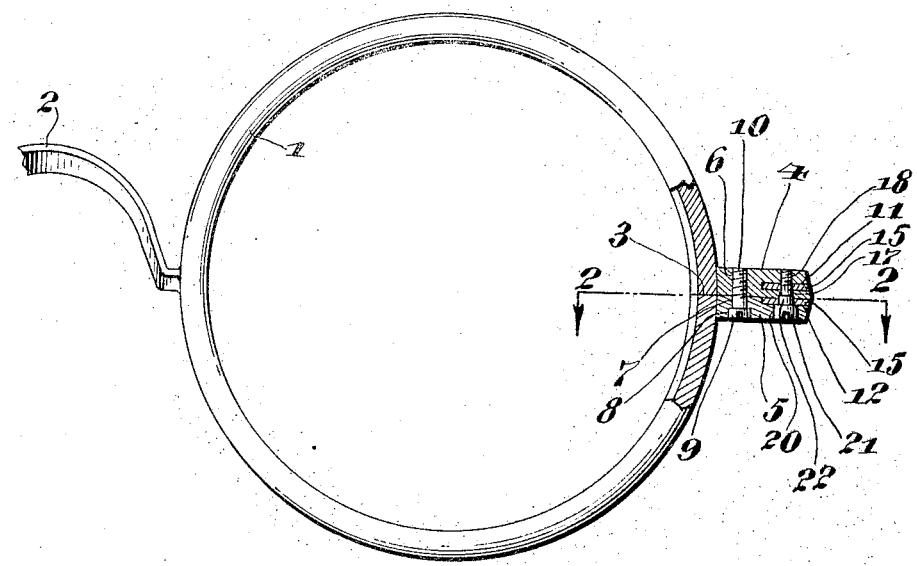
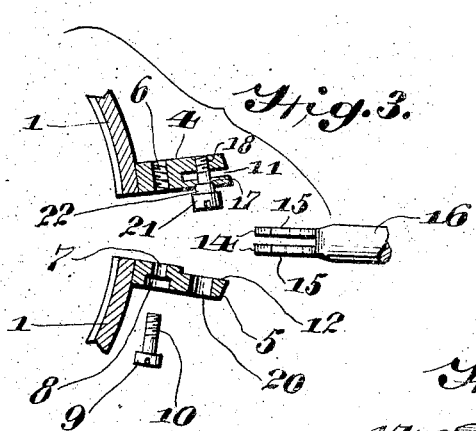
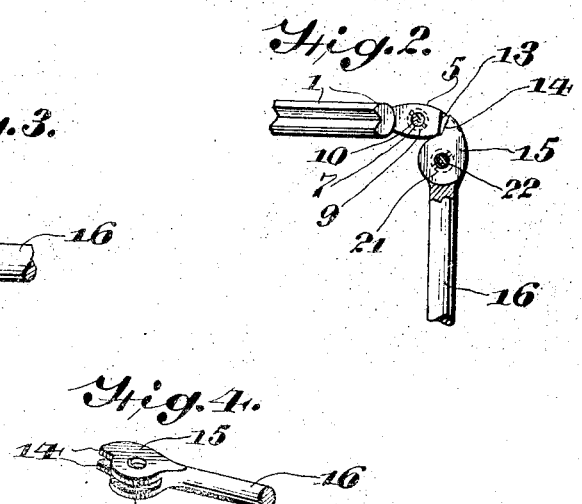
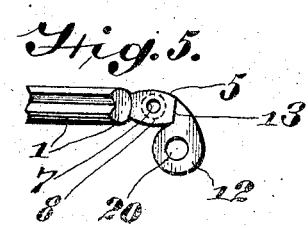
INVENTOR.
Alexander Anderson
BY Cyrus N Anderson
ATTORNEY.

Patented Apr. 13, 1926.

1,580,632

UNITED STATES PATENT OFFICE.

ALEXANDER ANDERSON, OF IRVINGTON, NEW JERSEY, ASSIGNOR TO CONTINENTAL OPTICAL CORPORATION, OF NEW YORK, N. Y., A CORPORATION OF DELAWARE.

OPHTHALMIC MOUNTING.

Application filed December 15, 1925. Serial No. 75,502.

*To all whom it may concern:*

Be it known that I, ALEXANDER ANDERSON, a citizen of the United States, and a resident of Irvington, in the county of Essex and State of New Jersey, have invented an Improvement in Ophthalmic Mountings, of which the following is a specification.

My invention relates to ophthalmic mountings and has particular relation to the connections between the temple wires and the temple lugs of spectacle frames.

The general object of the invention is to provide a novel construction of temple connection whereby the temple lugs secured to the adjacent opposing split ends of the rims of spectacle frames may be readily separated from each other without disturbing the pivot supports of the temple wires and whereby also the latter may be securely held in any position to which they may be adjusted about their pivots.

To this and other ends my invention comprehends the construction as hereinafter described in detail, particularly pointed out in the claims, and as illustrated in the accompanying drawing in which I have shown one form of a mechanical embodiment of the invention.

In the drawing:

Fig. 1 is a view showing a portion of one-half part of a spectacle frame in rear elevation and the remaining portion thereof including the temple connection in section, the said section being taken in a central plane parallel with the front and rear sides of the rim, the position of the temple pivot being distorted for convenience of illustration;

Fig. 2 is a view taken on the line 2—2 of Fig. 1;

Fig. 3 is a view showing the split end portions of the temples and the lugs connected therewith separated and in section with the basal or pivot end portion of a temple wire ready to be placed in position upon the temple lugs;

Fig. 4 is a view in perspective of the basal or pivot end portion of a temple wire; and Fig. 5 is a plan view of one end portion of a rim and a temple lug secured thereto.

Referring to the drawing: 1 designates a rim of a spectacle frame, which rim is connected by a bridge 2 to the other rim, not shown. The outer portion of the rim is split as at 3 and the split end portions are provided with temple lugs 4 and 5. The temple lug 4 is provided with a screw-threaded opening 6, while the lug 5 is provided with a nonscrew-threaded opening 7 the outer end of which is enlarged, as indicated at 8, for the reception of the head 9 of a screw 10 employed for fastening the lugs 4 and 5 together.

The outer end of the lug 4 is provided with a slot 11, while the inner side of the outer end portion of the lug 5 is provided with a notch 12. The inner ends of the slot 11 and notch 12 form shoulders 13 against which the shoulders 14 of the ears 15 of the pivot or basal end of the temple 16 are adapted to contact for the purpose of limiting the outer pivotal movement of the said temple. The portions of the lug 4 upon opposite sides of the slot 11 are provided with perforations or holes 17 and 18, the latter being located in the outermost of the said portions and being screw-threaded. The inner end of the perforation or hole 17 is enlarged for a purpose to be hereinafter referred to. The opposite lug 5 is provided with a relatively large opening 20 of a size to receive the head 21 of the pivot screw which extends through the holes 17 and 18 and has screw-threaded engagement with the hole 18. The pivot screw comprises a pivot portion 22 adjacent the head 21 which extends across the notch 12 previously referred to. The portion 22 is of less diameter than the head 21 so that the two are separated by a shoulder which is adapted to contact with and press against the bottom or underside of the ear 15 which is located in the notch 12 and which is pivoted upon the said portion 22. The lower end of the hole 17 is slightly enlarged to receive the inner end of the portion 22 of the pivot screw, which portion is of greater diameter than the remaining upper end portion of the said screw which extends across the slot 11 and constitutes a bearing for the other of the ears 15.

It will be seen that the shoulder between the head 21 and portion 22 of the pivot screw presses firmly against the outer side of the bottom ear 15 and forces the same against the inner side of the temple lug 4. At the same time the inner portion of the temple lug 4 below the slot 11 is pressed by the shoulder between the portion 22 and the upper end portion of the screw against the inner side of the other of the said ears 15 to force the outer side of the latter against the inner side of the portion of the lug 15 above the slot 11.

It will be seen that by my construction I have provided means whereby the friction between the ears of the pivot or basal end of the temple and the temple lugs may be varied by varying the reactive pressure between the said ears and portions of the temple lugs. It also will be seen that I have provided means whereby the fastening screw 10 may be removed and the temple lugs 4 and 5 and the split ends of the rim 1 separated without disturbing the pivot connection between the temple and the temple lugs.

Having thus described my invention, what I claim and desire to secure by Letters Patent is:

1. An ophthalmic mounting for spectacle frames with split rims comprising temple lugs one of which is provided with a slot extending in parallel relation to the upper and lower sides thereof and the other one of which is provided with a notch upon the upper side of its outer end portion, the latter lug being provided with a hole therethrough of a size to receive the head of a pivot screw and the other temple lug being provided with a hole extending transversely therethrough, the upper end of which is screw-threaded, a pivot screw extending through said holes and having a plurality of bearing portions extending across said slot and notch, a temple wire having ears mounted upon the said bearing portions within the said slot and notch, and the said pivot screw being provided with a shoulder intermediate its head and one of the said bearing portions which is adapted to press against the adjacent side of one of the ears of the said temple and the said pivot screw also being provided with a shoulder intermediate the last mentioned bearing portion thereof and the bearing portion for the other of the said ears, which shoulder is adapted to bear against the lower side of the slotted temple lug, substantially as and for the purpose described.

2. An ophthalmic mounting for spectacle frames with split rims comprising temple lugs secured to the adjacent opposing split ends of a rim, one of the said temple lugs being provided with a slot arranged in parallel relation to the upper and lower sides thereof and the other of said lugs being provided with a notch upon the upper side of its outer end portion, said notch being in parallel relation to the said slot, means for detachably connecting the said lugs together, a temple wire having its basal or pivot end provided with ears, one of which is adapted to be located within the said slot and the other within the said notch, said ears being provided with holes extending therethrough, and the outer ends of the said temple lugs being provided with holes extending therethrough with which the openings through the said ears are adapted to be placed in alinement, a headed pivot screw mounted in said holes, one of the said holes being of a size to receive the head of said screw and to permit the said head to pass therethrough, and the said pivot screw having bearing portions, one of which is located adjacent said head and the said bearing portions being separated from each other by a shoulder, the said head pressing against the outer side of one of the ears of the temple wire, while the said shoulder presses against the inner side of one of the said lugs, substantially as and for the purpose described.

In testimony that I claim the foregoing as my invention, I have hereunto signed my name this 8th day of December, A. D., 1925.

ALEXANDER ANDERSON.